C. E. RILEY.
SUIT CASE HANDLE.
APPLICATION FILED OCT. 26, 1911.
1,029,634.
Patented June 18, 1912.
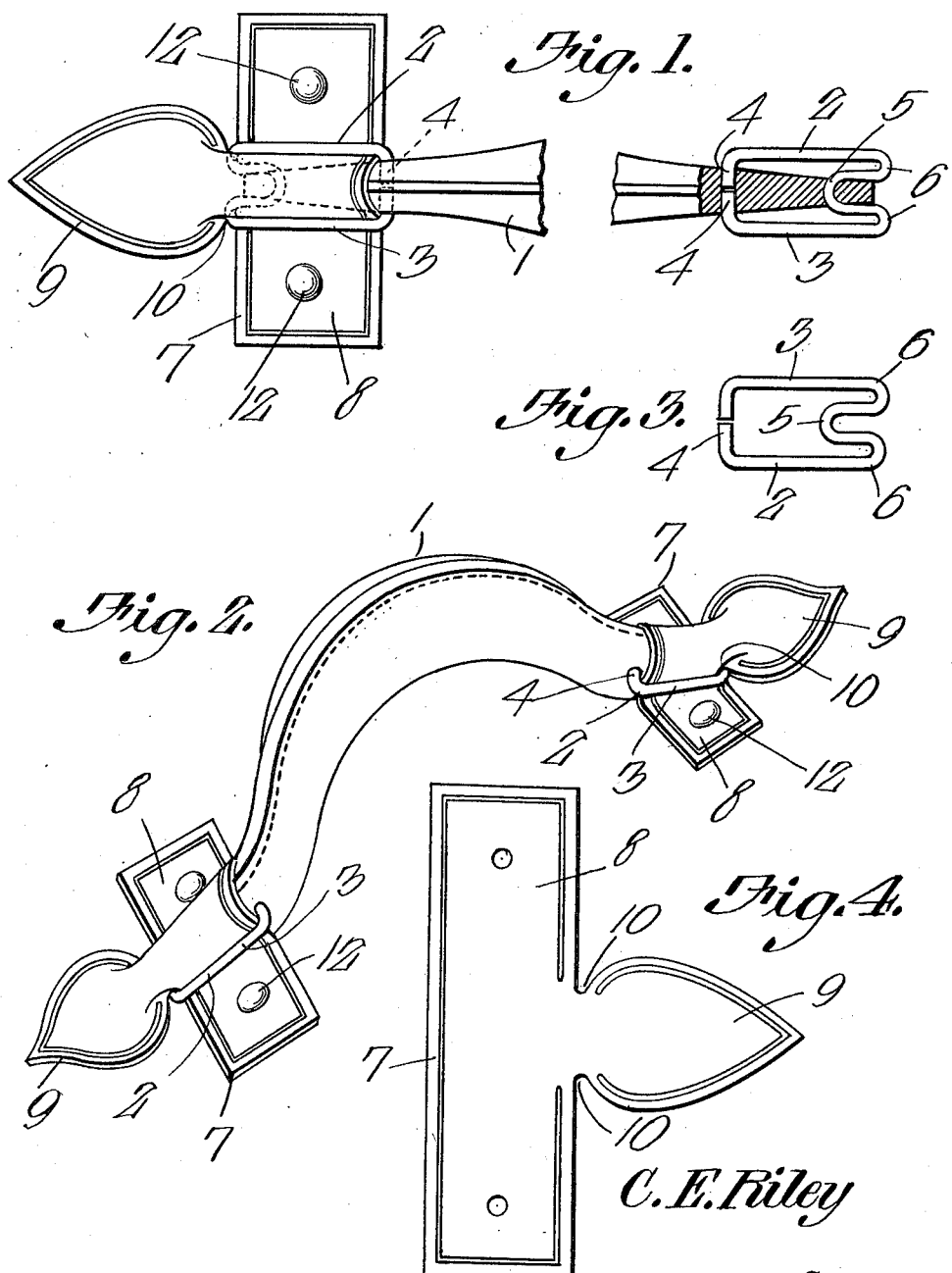

UNITED STATES PATENT OFFICE.

CHARLES E. RILEY, OF CHARLESTOWN, INDIANA.

SUIT-CASE HANDLE.

1,029,634.　　　　Specification of Letters Patent.　　Patented June 18, 1912.

Application filed October 26, 1911. Serial No. 656,819.

*To all whom it may concern:*

Be it known that I, CHARLES E. RILEY, a citizen of the United States, residing at Charlestown, in the county of Clark and State of Indiana, have invented a new and useful Suit-Case Handle, of which the following is a specification.

It is the object of the present invention to provide a handle for suit cases and the like, which handle may readily be assembled with the suit case.

A further object of the invention is to provide a link of novel and improved form, whereby an attaching member may be connected with the handle in such a manner as to provide for a maximum arching, with a minimum length of handle.

A further object of the invention is to provide a novel means for assembling an attaching member with a handle, whereby the attaching member will cover and protect the end of the handle.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a fragmental top plan, parts being sectioned; Fig. 2 shows the invention in perspective; Fig. 3 is a plan of the link whereby the attaching member is assembled with the handle; and Fig. 4 is a plan of the attaching member.

The handle 1 is fashioned preferably, although not necessarily from leather, and is of the common, arched form. Adjacent the ends of the handle 1, links 2 are placed. The sides 3 of each link extend along the sides of the handle 1, and at one end, the sides 3 of the link are bent to form rectangularly disposed, axially alined fingers 4 which enter the handle. The intermediate portion of the opposite end of the link is fashioned into an arched, inwardly projecting head 5, the head 5 being extended through the handle, as clearly shown in Fig. 1. The head 5 serves to define loops 6 at the end of the link. 2. The loops 6 project beyond the end of the handle 1.

The invention further includes an attaching member denoted generally by the numeral 7. This member 7 includes a body 8 and a rectangularly disposed, spear-shaped tongue 9. The body 8 of the attaching member is extended across the top of the handle 1, the ends of the body 8 being threaded between the sides 3 of the link 2 and the handle 1, the body 8 fitting into the loops 6, and substantially filling the link longitudinally, so that the attaching member cannot move upon the handle 1, longitudinally of the handle. The spear-shaped tongue 9 of the attaching member overlies and protects the end of the handle, and also overlies the extremities of the loops 6, these loops 6 engaging, as clearly shown in Fig. 2, in the angles 10 formed at the point of juncture between the tongue 9 and the body 8.

As will be readily understood, the ends of the body 8 may readily be threaded between the sides 3 of the link and the handle 1, suitable attaching elements 12 being employed for securing the ends of the body 8 to the satchel or suit case.

Owing to the fact that the loops 6 and the tongue 9 project beyond the end of the handle 1, the handle 1 may be made relatively short, permitting a maximum arching of the handle 1, with a minimum handle length. The tongues 9 serve to protect the ends of the handle and to hide the same from view, and the points of attachment between the arched heads 5 and the handle 1 are adequately covered and shielded by the tongues 9.

Having thus described the invention, what is claimed is:—

1. In a device of the class described, a handle; an attaching member comprising a body extended transversely of the handle, and a tongue projecting from the body in alinement with the handle; and a link connected at both ends with the handle and extended across the body, the tongue projecting beyond one end of the link and housing the end of the handle.

2. In a device of the class described, a handle; a link connected at one end with the handle and provided at the other end with an inwardly projecting, arched head also engaged with the handle, the head defining loops at the sides of the link; and an attaching member comprising a body extended transversely of the handle, the body being located between the link and the handle and in the loops, there being a tongue outstanding from the body beyond the ends of the loops.

3. In a device of the class described, a handle; a link having at one extremity, separable end portions engaged with the handle, the link having at its other extremity, an inwardly projecting arched head also engaged with the handle, the head defining loops at the sides of the link, projecting beyond the end of the handle; and an attaching member comprising a body threaded through the loops and located between the link and the handle, there being a tongue outstanding from the body, beyond the loops.

4. In a device of the class described, a handle; a link having at one extremity, separable end portions engaged with the handle, the link having at its other extremity, an inwardly projecting arched head also engaged with the handle, the head defining loops at the sides of the link; and an attaching member threaded through the loops and located between the link and the handle.

In testimony that I claim the foregoing as my own, I have hereto affixed my signature in the presence of two witnesses.

CHARLES E. RILEY.

Witnesses:
G. H. DEUSER,
F. O. McOWEN.

Copies of this patent may be obtained for five cents each, by addressing the "Commissioner of Patents, Washington, D. C."